United States Patent

[11] 3,583,203

[72] Inventors Orville R. Williams;
 Floyd D. Williams, Yukon, both of, Okla.
[21] Appl. No. 825,023
[22] Filed May 15, 1969
 Continuation-in-part of Ser. No. 652,117, July 10, 1967, Pat. No. 3,452,575.
[45] Patented June 8, 1971
[73] Assignee Jack C. Vian
 Yukon, Okla.

[54] VEHICLE FRAME AND BODY-STRAIGHTENING TOOL
 7 Claims, 9 Drawing Figs.
[52] U.S. Cl. .................................................. 72/446, 72/705
[51] Int. Cl. ..................................................... B21j 13/00
[50] Field of Search ........................................... 72/705, 392, 446, 447

[56] References Cited
 UNITED STATES PATENTS
 2,836,219  5/1958  Pertner ........................ 72/705
 3,122,194  2/1964  Bronson ...................... 72/705

Primary Examiner—Charles W. Lanham
Assistant Examiner—Michael J. Reenan
Attorney—Robert K. Rhea ABSTRACT: A vehicle surrounding horizontal base frame is flatly supported by a floor surface. A pulling tool comprising a horizontal support member and an upstanding pivoting lever is pivotally and movably connected with the base and projects toward a vehicle to be straightened. A pressure-operated cylinder is connected with the support member and the lever intermediate its ends to accomplish the pulling action. A holding tool is connected to a portion of the vehicle to be straightened by a flexible member and engages the base opposite the pulling tool which forms an anchor for the vehicle.

PATENTED JUN 8 1971
3,583,203
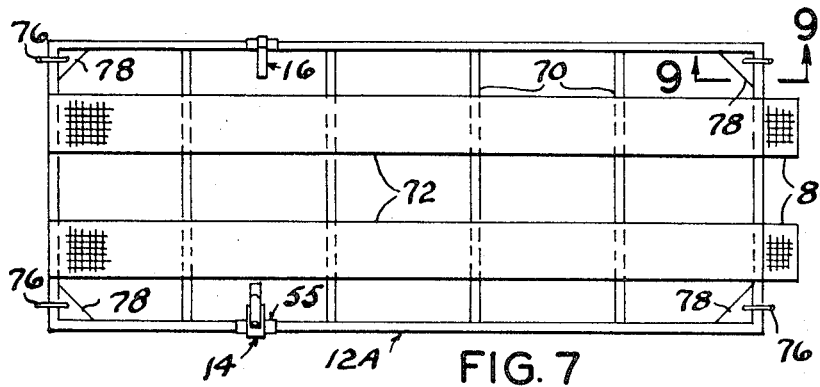
FIG. 7
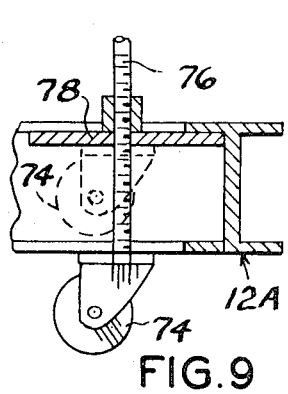
FIG. 9
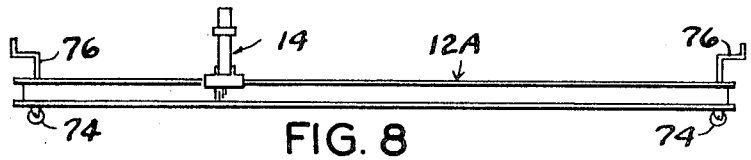
FIG. 8
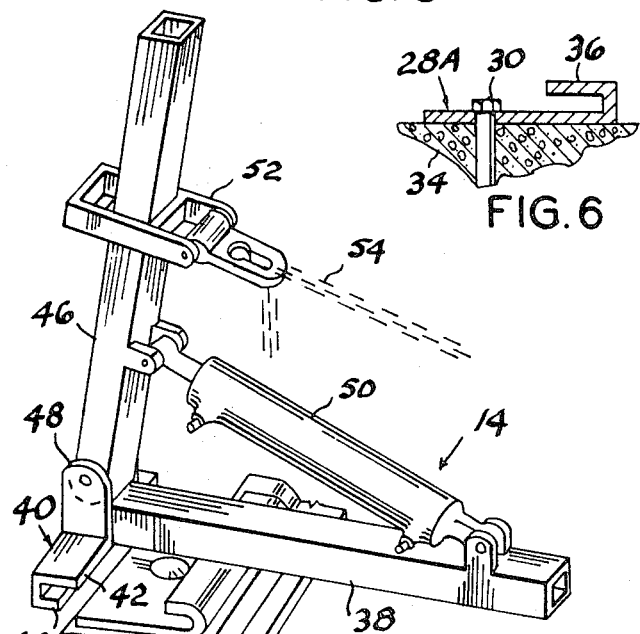
FIG. 6
FIG. 2
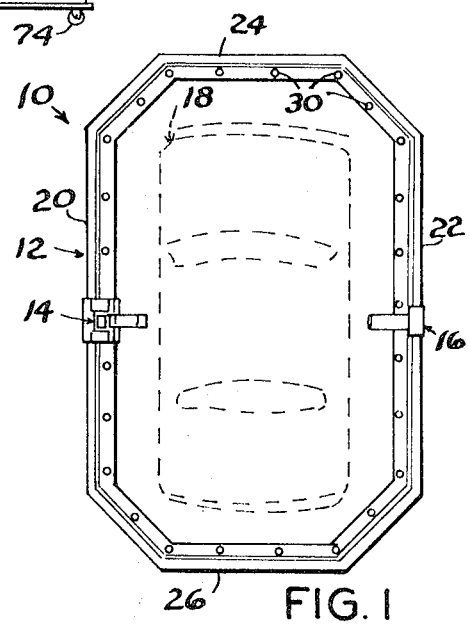
FIG. 1
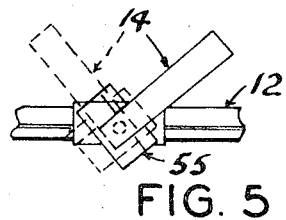
FIG. 5
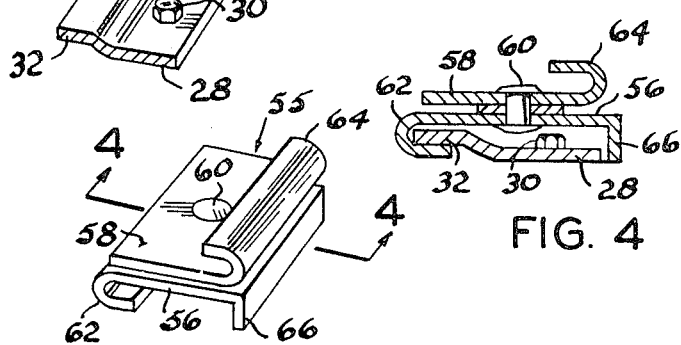
FIG. 3
FIG. 4
ORVILLE R. WILLIAMS
FLOYD D. WILLIAMS
INVENTORS.
BY Robert K. Rhea
AGENT 3,583,203

VEHICLE FRAME AND BODY-STRAIGHTENING TOOL

The present invention is a continuation-in-part of application Ser. No. 652,117, filed July 10, 1967, now U.S. Pat. No. 3,452,575 for Vehicle Frame And Body Straightening Tool.

BACKGROUND OF THE INVENTION

1. Field of the Invention

Repairs to vehicles damaged as the result of collisions is rendered difficult by the inability to conveniently apply a force to the damaged body or frame in a direction to force the damaged parts toward their original position. In many instances the damage to the vehicle includes a substantial part of the vehicle, such as a door, quarter panel or deck, as well as frame members. Each individual repair job usually requires consideration for the particular damaged member during a straightening operation.

2. Description of the Prior Art

The prior art, such as U.S. Pats. Nos. 2,836,219; 3,276,237 and 3,292,310, generally disclose elongated support members parallel with the desired direction of pull on a damaged vehicle component which is affected by force moving a standard connected with the vehicle part along the surface of the elongated member.

Applicant's device, on the other hand, provides a base frame surrounding the vehicle and a pressure cylinder operated pulling means pivotally supported by the base frame adjacent any peripheral portion of the vehicle. The vehicle is maintained stationary with respect to the base frame by a connection between the vehicle and the base frame opposite the pulling means.

SUMMARY OF THE INVENTION

An elongated baseplate forming a polygonal-shaped frame or rail is flatly connected to or rests upon a concrete floor in surrounding relation with respect to a vehicle to be straightened. The baseplate includes an outer flanged edge. A pulling tool comprising an elongated support, provided with a U-shaped socket at one end portion, is slidably engageable with the flanged edge of the baseplate and projects horizontally across the floor toward the vehicle to be straightened. Swivel means connects the socket to the flanged edge of the plate. An upstanding lever is pivotally connected at its depending end to the end portion of the support overlying the baseplate. A pressure-operated cylinder extends between and is connected to the inwardly extending portion of the support member and the lever intermediate the ends of the latter. A bracket member, slidably received by the lever outwardly of its connection with the pressure cylinder, is in turn connected with the vehicle by a flexible member. The side of the vehicle opposite the straightening means is anchored to the baseplate by a fixed position holding tool similar to the pulling tool and similarly connected to the flanged edge of the baseplate. A similar flexible member attaches the holding tool to the vehicle. Thus, the vehicle is held stationary with respect to the baseplate while the pulling and holding tools may be selectively positioned along the baseplate and connected with any desired portion of the vehicle.

It is, therefore, the principal object of this invention to provide a vehicle-straightening means comprising a pulling tool and a holding tool formed of relatively few components which are capable of being pivotally positioned at any desired location around a baseplate or rail and connected with the damaged vehicle.

BRIEF DESCRIPTION OF THE DRAWINGS

FIG. 1 is a top plan view of the device in operative position illustrating, by dotted lines, the relative position of a vehicle to be straightened;

FIG. 2 is a perspective view of the vehicle body pulling tool in exploded relation with respect to a swivel means connecting the pulling tool to a fragment of the base frame;

FIG. 3 is a perspective view of the swivel means, per se;

FIG. 4 is a vertical cross-sectional view taken substantially along the line 4-4 of FIG. 3 and including a cross section of the base frame;

FIG. 5 is a top view of a fragment of the base frame illustrating, by solid and dotted lines, the pivoting action of the pulling tool;

FIG. 6 is a fragmentary vertical cross-sectional view of an alternative form of the base frame;

FIG. 7 is a top plan view of another embodiment of the base frame;

FIG. 8 is a side elevational view of FIG. 7; and,

FIG. 9 is a fragmentary vertical cross-sectional view taken substantially along the line 9-9 of FIG. 7.

DESCRIPTION OF THE PREFERRED EMBODIMENTS

Like characters of reference designate like parts in those figures of the drawings in which they occur.

In the drawings:

The reference numeral 10 indicates the device, as a whole, comprising a base frame 12, a pulling tool 14 and an anchor means 16. The base frame or rail 12 is substantially polygonal in plan view, preferably of a size to completely surround a vehicle, indicated by the dotted lines 18, having portions to be straightened so that the frame presents parallel side members 20 and 22 at respective sides of the vehicle and parallel end members 24 and 26 at the respective ends of the vehicle.

As shown in FIGS. 2 and 4, the base rail 12 is formed by a plate, substantially rectangular in cross section, having a side edge portion 28 flatly contacting the upper surface of a concrete floor, or the like, and is secured thereto by bolts 30. The opposite or outwardly directed side edge portion of the rail is turned arcuately upward and outward, as at 32, in parallel spaced relation above the floor for the reasons presently apparent.

Alternatively, the rail 12 may be formed in the configuration shown in FIG. 6 and having its base portion 28A flatly contacting a concrete floor, indicated at 34, and secured thereto by the bolts 30. In this embodiment the outwardly directed side edge of the rail defines a U-shape having one leg 36 projecting toward the vehicle 18 in parallel spaced relation with respect to the floor contacting portion of the rail.

The pulling tool 14 comprises a generally horizontally disposed box-channel elongated member 38 which extends transversely of the rail 12 toward the vehicle 18. The outwardly disposed end portion of the member 38 has transversely secured thereto and depending therefrom a U-shaped member or socket 40 having its legs 42 and 44 projecting toward the opposite end of the member 38. An upwardly directed lever 46 is pivotally connected at its depending end between upstanding ears 48 secured to the U-shaped member 40 for pivoting movement of the lever 46 toward and away from the vehicle 18. A pressure cylinder 50 extends angularly between and is pivotally connected at its respective ends to the base member 38 and lever 46 intermediate the latter's ends. A suitable bracket 52 is slidably mounted on the free end portion of the lever 46 for engagement with and holding a flexible element, such as a chain 54, for connection with the vehicle 18.

Referring also to FIG. 3, the numeral 55 indicates a swiveling means for connecting the pulling tool 14 to the base rail 12. The swiveling means 55 comprises a pair of substantially flat plate members 56 and 58 centrally joined in superposed relation by a bolt or rivet 60 for pivoting movement of the upper plate 58 about the axis of the rivet. Each of the plates 56 and 58 are characterized by one longitudinal side edge being turned back upon itself to form oppositely directed substantially J-shaped hooks 62 and 64, respectively. The bottom plate 56 further includes, at its edge opposite its J-shaped hook 62, a depending flange 66 for contacting the common supporting surface inwardly of the rail edge, as shown in FIG. 4, to maintain the plate 56 substantially horizontal. The J-shaped hook 62 of the bottom plate engages under the base rail edge 32, as shown in FIG. 4, while the upper plate's J-shaped hook 64 is cooperatively received between the legs 42 and 44 of the pulling tool socket 40. The purpose of the swiveling means 55 is to permit pivoting movement of the pulling tool 14 in opposing directions, as illustrated in FIG. 5, so that the pulling tool need not be placed precisely opposite the portion of the vehicle to be pulled on or straightened. In some instances it is impractical to pull in a lateral direction and an angular pull on the damaged portion of the vehicle will more efficiently accomplish the straightening function. The angular position permitted to perform such a pulling action by the swiveling means 55 is, of course, limited to the coefficient of sliding friction between the J-shaped hooks 62 and 64 and their contact with the rail 12 and U-shaped socket leg 44, however, we have found that such an angular pull may be easily accomplished up to an angle of 40° on either side of a line through the axis of the pivot rivet 60 and perpendicular with respect to the side edge of the rail 12.

Referring now more particularly to FIGS. 7, 8 and 9, an alternative embodiment of the base rail is indicated at 12A, which is substantially rectangular in general configuration and dimensioned to surround and support a vehicle to be straightened. The base rail 12A is preferably formed of H or I-beam material, as shown in cross section (FIG. 9), so that one of its horizontal flanges projects laterally outward of the overall configuration. However, the base rail may be formed of channel material having its legs similarly projecting outward parallel with the supporting surface. The base rail 12A is cross braced by similar I-beams, indicated at 70, extending transversely of the base rail 12A in parallel spaced relation. A pair of vehicle wheel supporting strips, for example, expanded metal, indicated at 72, overlies the base rail 12A and its cross braces 70 in longitudinal spaced parallel relation. The base rail 12A is preferably equipped with a caster 74, or the like, at each of its respective corners which permits movement of the base rail 12A to a desired position in a shop, or the like, not shown. Each of the casters 74 are preferably supported by a crank handle 76 threadedly secured to and extending vertically through a corner brace plate 78 of the base rail so that rotation of the handle 76 extends and retracts the respective caster 74 for mobile movement of the base rail 12A and when retracted, as shown by dotted lines (FIG. 9), permits contiguous contact of the rail 12A with a supporting surface around the vehicle 18. Since the upper limit of the base rail 12A projects above a common supporting surface a substantial distance, approach ramps 80 are provided for movement of the vehicle wheels toward and on the respective supporting strip 72.

Obviously the invention is susceptible to changes or alterations without defeating its practicability, therefore, we do not wish to be confined to the preferred embodiment shown in the drawings and described herein.

We claim:

1. An apparatus for straightening damaged vehicles, comprising:
    a base rail of polygonal form adapted to surround a vehicle and flatly contact a horizontal supporting surface, said base rail having a horizontal outwardly projecting flange;
    pulling tool means for connection with a vehicle, said pulling tool means having a horizontally disposed U-shaped socket engageable with the flange of said base rail; and
    swivel means interposed between and connecting the U-shaped socket of said pulling tool with said base rail flange.

2. Structure as specified in claim 1 in which said pulling tool further includes,
    a generally horizontally disposed support member connected with and extending laterally of the U-shaped socket and extending transversely across one side of said base frame;
    a generally upright lever pivotally connected at its depending end with said support member above the U-shaped socket; and
    a pressure cylinder pivotally connected between said support member and the lower end portion of said lever below its mid point.

3. Structure as specified in claim 1 in which said swivel means comprises,
    a pair of substantially J-shaped plates pivotally joined together by the leg portion of their respective J-shape.

4. Structure as specified in claim 2 in which said swivel means comprises,
    a pair of substantially J-shaped plates pivotally joined together by the leg portion of their respective J-shape.

5. Structure as specified in claim 4 in which said base rail comprises,
    a beam,
        said beam having a depending flange parallel with respect to said horizontal flange; and
    retractable rollers connected with said beam for mobile movement of the latter.

6. In an apparatus for straightening damaged vehicles in combination with a base rail adapted to surround a vehicle and be supported by a horizontal surface, said base rail having an outstanding horizontal flange spaced above the horizontal surface and a pulling tool having a U-shaped socket adapted to be engaged with the flange of said rail and project toward a rail surrounded vehicle for connection therewith, the improvement comprising; a swivel means connecting said pulling tool with said rail said swivel means comprising, a pair of superposed plates pivotally connected for horizontal rotative movement with respect to each other about a vertical axis, and means on each said plate for cooperative engagement with the U-shaped socket of said pulling tool and said rail flange, respectively.

7. Structure as specified in claim 6 in which the last-mentioned means comprises,
    a J-shaped hook formed on one side edge portion of each said plate, said J-shaped hooks opening in opposing directions.